(12) United States Patent
Pan

(10) Patent No.: US 6,539,469 B1
(45) Date of Patent: Mar. 25, 2003

(54) ROTATOR CIRCULAR BUFFER WITH ENTRIES TO STORE DIVIDED BUNDLES OF INSTRUCTIONS FROM EACH CACHE LINE FOR OPTIMIZED INSTRUCTION SUPPLY

(75) Inventor: Jesse Pan, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/416,405

(22) Filed: Oct. 12, 1999

(51) Int. Cl.[7] .................................................. G06F 9/38
(52) U.S. Cl. ........................ 712/205; 711/110; 712/204; 712/206; 712/214; 712/215
(58) Field of Search .................................. 712/204, 214, 712/215, 205, 206; 711/110

(56) References Cited

U.S. PATENT DOCUMENTS

| 5,586,295 A | * 12/1996 | Tran ............................. 711/125 |
| 5,748,978 A | * 5/1998 | Narayan et al. ............. 712/204 |
| 5,754,811 A | * 5/1998 | Putrino et al. .............. 712/214 |

* cited by examiner

*Primary Examiner*—Kenneth S. Kim
(74) *Attorney, Agent, or Firm*—Blakley, Sokoloff, Taylor & Zafman LLP

(57) ABSTRACT

A processor comprises an instruction cache that stores a cache line of instructions and an execution engine for executing the instructions, along with a buffer to store a plurality of entries. A first logic circuit divides the cache line into instruction bundles, each of which gets written into an entry of the buffer. A second logic circuit reads out a number of consecutive instruction bundles from the buffer for dispersal to the execution engine to optimize speculative fetching and maximizing instruction supply to the execution resources of the processor.

19 Claims, 2 Drawing Sheets

ROTATOR CIRCULAR BUFFER WITH ENTRIES TO STORE DIVIDED BUNDLES OF INSTRUCTIONS FROM EACH CACHE LINE FOR OPTIMIZED INSTRUCTION SUPPLY

FIELD OF THE INVENTION

This invention relates to the field of microprocessors fabricated on an integrated circuit or chip. More specifically, the invention relates to methods and apparatus for improved instruction throughput in a high-performance processor.

BACKGROUND OF THE INVENTION

Microprocessors are typically divided into functional blocks or stages through which instructions are propagated and processed. This allows for pipelining of instructions such that when one instruction has completed the first stage of processing and moves on to the second stage, a second instruction may begin the first stage. Thus, even where each instruction requires a number of clock cycles to complete all stages of processing, pipelining provides for the completion of instructions on every clock cycle. This single-cycle throughput of a pipelined processor greatly increases the overall performance of computer systems. Superscalar processors are capable of initiating more than one instruction at the initial stage of the pipeline per clock cycle. Frequently, more than one instruction completes on each given clock cycle of the machine.

Many modern processors employ a separate instruction cache for storing instructions to be executed by the program or code sequence running on the computer system. Usually, a fast, local instruction cache memory (L0), which is incorporated on the same integrated circuit as the processor itself, is utilized for this purpose. In many cases, a processor includes an instruction fetch unit that is responsible for deciding which instruction cache entry ought to be accessed next to maximize program performance. To operate efficiently, the instruction fetch unit should provide a continual stream of instructions from the instruction cache memory to the pipeline, where they eventually get dispersed to the processor's execution core.

Difficulties arise in computer systems that attempt to take advantage of the parallelism present in a program by executing instructions based on data dependencies and resource availability. These types of machines are referred to as "out-of-order" computing machines. The term "out-of-order" means not necessarily executed in the same sequence implied by the source program. Moreover, there exists a further problem in keeping track of pending instruction fetch requests from in the face of mispredicted branches. In some instances, instructions are fetched speculatively, based on a predicted program execution path. These machines place enormous performance demands on the fetch logic circuitry of the processor.

SUMMARY OF THE INVENTION

The present invention is useful in optimizing the speculative fetching engine of a high-performance processor and advantageously maximizes the supply of instructions to the processor's execution core. In one embodiment, the invention comprises an instruction cache that stores a cache line of instructions and an execution engine for executing the instructions. A buffer is provided to store a plurality of entries. A first logic circuit divides the cache line into instruction bundles, each of which gets written into an entry of the buffer. A second logic circuit reads out a number of consecutive instruction bundles from the buffer for dispersal to the execution engine.

BRIEF DESCRIPTION OF THE DRAWINGS

The present invention is illustrated by way of example, and not limitation, in the Figures of the accompanying drawings, wherein.

DETAILED DESCRIPTION

Throughout the following description specific details are set forth such as file sizes, logic circuit types, byte sizes, etc., in order to provide a thorough understanding of the invention. It should be understood, however, that the invention might be practiced without these particulars. In other instances, well known elements have not been shown or described in detail to avoid unnecessarily obscuring the present invention.

Figure 1:
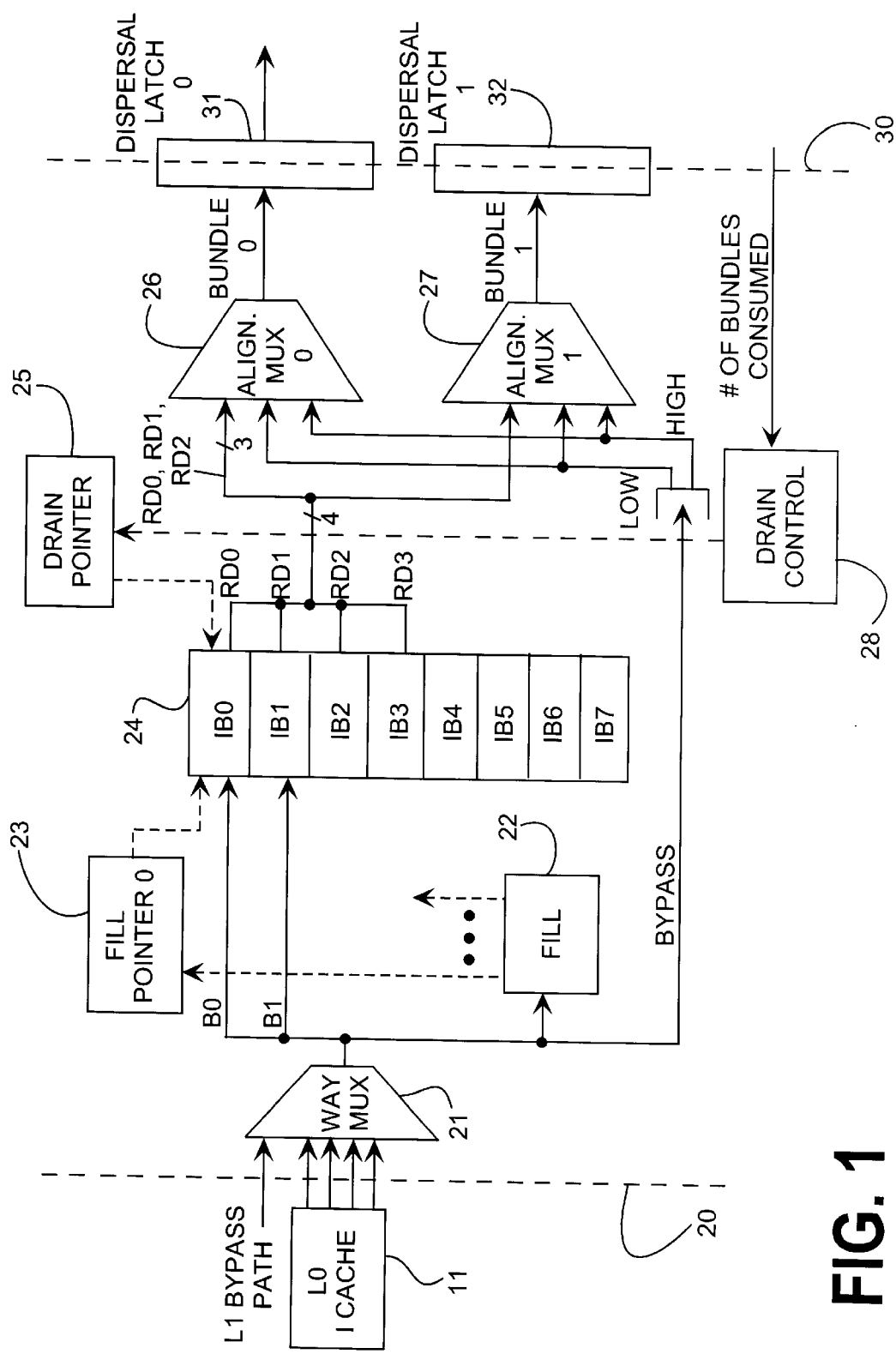
FIG. 1 is a functional block diagram of one embodiment of the rotator buffer logic circuitry of the present invention.

The processor the present invention includes a first-in-first-out (FIFO) queuing storage unit which occupies the rotate (ROT) pipeline stage of the processor. Referring to FIG. 1, the rotator buffer logic associated with the rotate pipeline stage of the processor is shown. The rotate pipeline stage is shown between dashed lines 20 and 30, which lines represent the clock transition edges of a single clock cycle. In other words, all of logic shown in FIG. 1 fits into a single CPU clock cycle of the processor.

The rotate pipeline stage of the processor takes the 32-byte instruction cache line output from the four-way, L0 instruction way multiplexer 21 and divides the cache line into two 16-byte instruction bundles. Way multiplexer 21 a shown coupled to a first level (L0) instruction cache 11, which in the particular embodiment described, resides on the same integrated circuit as the processor. The two 16-byte instruction bundles are denoted as B0 and B1 provided at the output of way multiplexer 21 in FIG. 1. In addition, two additional bundles may be provided from next level cache (e.g., L1) in the memory hierarchy. This is indicated in FIG. 1 by the bypass path output from way multiplexer 21.

Assuming that there are no bundles available in the first level cache memory (i.e., L0 is empty), fetching may occur from the next level cache. That is, instructions may be fetched directly from the second level cache (L1) and bypassed directly to way multiplexer 21. In this manner, cache line readout may either take place from the L0 instruction cache 11, or bypassed directly from L1 instruction cache (not shown).

Following way multiplexer 21, the instruction cache line (or the two bundles) enters the rotate pipeline stage. To provide the bundles to the execution core, the alignment multiplexers 31 and 32 can select among two bypass bundles from the multiplexer output, and four consecutive bundles from buffer 24. If there are less than two bundles available in buffer 24 and there are bundles available at multiplexer 21, then alignment multiplexers 31 and 32 may select bundles from multiplexer 21 for bypass to the execution core. Practitioners in the computer arts will appreciate that this bypass scheme implemented in the rotate pipeline stage achieves a maximum throughput that avoids empty pipe stages in the execution core.

As discussed above, instructions are encoded in bundles according to one embodiment of the processor of the present invention. Each bundle includes a plurality of instructions and a template field grouped together in a N-bit field. The instructions are located in instruction slots of the N-bit field, with the template field specifying a mapping of the instruction slots to the execution unit types. Other encodings or grouping of instructions are also possible, and are considered within the scope of the present invention.

With continuing reference to the embodiment of FIG. 1, the input to rotator buffer 24 can be zero, one, or two instruction bundles. The number of bundles issued to the EXP stage that are consumed by the execution core may also be zero, one, or two bundles. Note, however, that information about number of bundles available in the number of bundles consumed by the execution core is not available to the rotate pipeline stage logic until the middle of the CPU clock cycle.

Rotate buffer 24 is organized as a circular, wrap-around buffer, which is implemented in the embodiment of FIG. 1 with eight entries, labeled $IB_0-IB_7$. Rotate buffer 24 has an associated starting write pointer 23 that points to a starting entry for filling (i.e., writing) of instruction bundles into the buffer. Fill operations are controlled by fill control logic block 22. Filling operations take place in-order; that is, according to the original code sequence of the program. After each entry location of buffer 24 gets written with an instruction bundle, fill pointer 23 advances in one position in the buffer stack.

On the readout side, a starting read pointer (i.e., drain pointer) 25 is also associated with buffer 24. FIG. 1 shows the starting read pointer point to $IB_0$, with up to four instruction bundles ($IB_0-IB_3$) being read out each clock cycle. The speculative read of the buffer is performed by reading out four consecutive bundles starting from the starting read pointer location, and sending the instruction data to the alignment multiplexers 26 and 27. Depending on the number of bundles consumed by the execution core, the number of bundles available from buffer 24, and the number read from cache 11, the appropriate bundles from the speculative read and the bypass case are selected from each alignment multiplexer.

According to the embodiment of FIG. 1, the number of bundles consumed by the execution core is at most two; the number of bundles read from buffer 24 is at most four; and the number read from cache 11 is at most two. Drain control logic unit 28 receives information about the number of bundles consumed in the execution core. Once the bundle consumption information becomes available, two different bypass combinations and four consecutive bundles from rotator buffer 24 are speculatively read out and then selected.

Alignment multiplexers 26 and 27 are an in-order output to the dispersal stage to maintain the FIFO scheme. The alignment multiplexers perform any needed rotation, selecting the appropriate bundles to be latched in dispersal latches 31 & 32, respectively. Each of the alignment multiplexers has six inputs, two of which are the instruction cache way multiplexer (21) outputs, with each bypass instance consisting of two instruction bundles. Also included among the inputs to the alignment multiplexers are the four other consecutive instruction bundles read out from rotator buffer 24.

As the execution engine of the processor consumes instruction bundles, next in-order bundles get consecutively latched into the dispersal latches through the alignment multiplexers. In operation, drain pointer 25 basically trails fill pointer 23, wrapping around the end of the rotate buffer 24.

Figure 2:
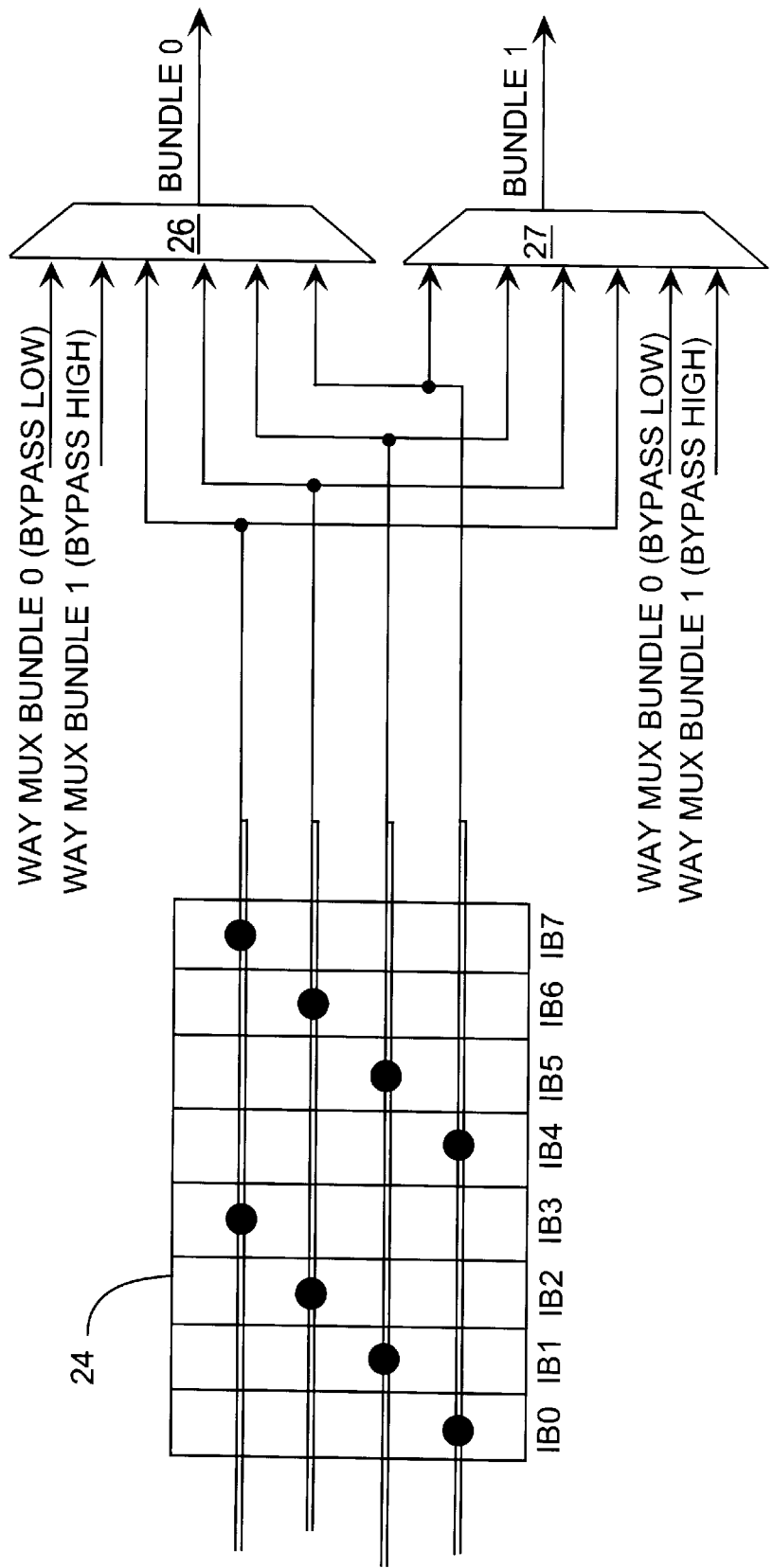
FIG. 2 is diagram illustrating the shared read port bus implemented in one embodiment of the present invention.

With reference to FIG. 2, the bus wire routing of the single read port of rotate buffer 24 is shown. Due to the speculative read, the wiring bundles, and their associated tagging information, an ordinary practitioner might expect that a large routing area would be required to implement the logic of the rotate buffer pipestage. One of the important aspects of the present invention is that rotate buffer 24 utilizes a shared read port design that optimizes usage of silicon area. In other words, the single read port buffer 24 is used to read out four consecutive instruction bundles to alignment multiplexers 26 and 27; however, the number of read ports of the register file memory cells is reduced from two ports per cell to one per cell. This reduces the transistor count from twenty transistors per cell to fourteen transistors per memory cell, and also reduces the number of read enables that need to be routed to each cell from four to one. Altogether, for the described embodiment, there are eight buffers per bit, with a total of 2032 memory cells and eight (rather than thirty-two) read enables.

As can be seen in FIG. 2, the 8-entry register file of buffer 24 is organized such that every fourth entry shares the single read port bus. For example, $IB_0$ shares the bus with $IB_4$, $IB_1$ shares the bus with $IB_5$, $IB_2$ shares the bus with $IB_6$, and $IB_3$ shares the bus with $IB_7$. This approach optimizes area savings of by taking advantage of the consecutive entries read from the buffer.

Instead of implementing buffer 24 as a register file, it could also be implemented as a memory array, with an associated address index. Use further appreciated that the concept of the present invention can be extended to include a single write port, rather than the dual write port scheme shown in FIG. 1. In the case of a single write port a simple on/even scheme may be employed in which odd entries ($IB_1$, $IB_3$, $IB_5$, and $IB_7$) are organized in one group, and even entries ($IB_0$, $IB_2$, $IB_4$, and $IB_6$) are organized in another group.

It should be understood that although the present invention has been described in conjunction with specific embodiments, numerous modifications and alterations could be made without departing from the scope of the present invention. Accordingly, the specification and drawings are to be regarded in an illustrative rather than a restrictive sense.

I claim:

1. A processor comprising:
   an instruction cache that stores a cache line of instructions;
   an execution engine for executing the instructions;
   a circular buffer having a plurality of entries;
   a first logic circuit that divides the cache line into instruction bundles, each of which is written into an entry of the circular buffer; and
   a second logic circuit that reads out a number of consecutive instruction bundles from the circular buffer for dispersal to the execution engine.

2. A processor comprising:
   an instruction cache that stores a cache line of instructions;
   an execution engine for executing the instructions;
   a buffer having a starting write pointer and a starting read pointer;
   a first logic circuit that divides the cache line into instruction bundles, each of which is written into an entry of the buffer; and
   a second logic circuit that reads out a number of consecutive instruction bundles from the buffer for dispersal to the execution engine.

3. The processor of claim 1 wherein the number of consecutive instruction bundles is equal to 4.

4. The processor of claim 1 further comprising an instruction bypass path coupled between the first and second logic circuits.

5. The processor of claim 1 wherein the plurality of entries is equal to 8 and the cache line comprises 32 bytes.

6. A processor comprising:

an instruction cache that stores a cache line of instructions;

an execution core for executing the instructions;

a first multiplexer circuit that divides the cache line into instruction bundles;

a N-entry buffer having a plurality of entries and a single read port, the buffer being organized such that every ith entry shares the single read port, the buffer including a fill pointer that points to a starting entry for filling with an instruction bundle provided by the first logic circuit; and a second multiplexer circuit that aligns and presents each instruction bundle to the execution core;

drain control logic that selects an appropriate number of instruction bundles read out from the buffer.

7. The processor of claim 6 wherein the cache line comprises 32 bytes.

8. The processor of claim 7 wherein N=8 and i=4.

9. The processor of claim 6 wherein the number of consecutive instructions is equal to 4.

10. The processor of claim 6 further comprising an instruction bypass path coupled between the first and second multiplexer circuits.

11. The processor of claim 10 wherein the instruction bypass path transfers a pair of instruction bundles.

12. The processor of claim 6 wherein the second multiplexer circuit includes latches that latch the instruction bundles prior to dispersal to the execution core.

13. The processor of claim 10 wherein the instruction bypass path transfers a pair of instruction bundles.

14. The processor of claim 10 wherein the buffer comprises a circular buffer.

15. A logic circuit which supplies instructions from an instruction cache to the execution core of a processor comprising:

a circular buffer having N-entries and a read pointer and a write pointer, the circular buffer having a pair of write ports and a single read port, the circular buffer being organized such that every ith entry shares the single read port;

way multiplexer logic for dividing a cache line of the instruction cache into first and second instruction bundles, the first and second instruction bundles being written into consecutive entries of the circular buffer starting from the write pointer;

alignment multiplexer logic for aligning and presenting individual ones of the instruction bundles to the execution core of the processor, wherein j consecutive instruction bundles are read out of the circular buffer at a time starting from the read pointer; and control logic for selecting instruction bundles to be output from the alignment multiplexer logic.

16. The logic circuit of claim 15 wherein the alignment multiplexer logic comprises:

first and second latches; and first and second multiplexers coupled to the single read port of the circular buffer, the first and second multiplexers each outputting an instruction bundle which is respectively latched in the first and second latches prior to dispersal to the execution core.

17. The logic circuit of claim 16 further comprising:

an instruction bypass path coupled between the way multiplexer logic and the alignment multiplexer logic; and wherein the control logic selects appropriate instruction bundles to be output from the first and second multiplexers depending on a number of instruction bundles consumed by the execution core, and a number of instruction bundles available from the circular buffer.

18. The logic circuit of claim 17 wherein the number of instruction bundles consumed by the execution core in a clock cycle is at most 2.

19. The logic circuit of claim 17 wherein the number of instruction bundles available from the circular buffer in a clock cycle is at most 4.

* * * * *

UNITED STATES PATENT AND TRADEMARK OFFICE
CERTIFICATE OF CORRECTION

PATENT NO.    : 6,539,469 B1  
DATED         : March 25, 2003  
INVENTOR(S)   : Jesse Pan It is certified that error appears in the above-identified patent and that said Letters Patent is hereby corrected as shown below:

Column 1,
Line 30, delete "modem", insert -- modern --.

Signed and Sealed this

Second Day of September, 2003

JAMES E. ROGAN
*Director of the United States Patent and Trademark Office*